United States Patent [19]

Donahue, Jr. et al.

[11] 4,174,091
[45] Nov. 13, 1979

[54] DRAIN VALVE

[75] Inventors: William R. Donahue, Jr., Batavia; Wesley S. Swanson, Elk Grove Village, both of Ill.

[73] Assignee: Eaton Corporation, Cleveland, Ohio

[21] Appl. No.: 937,356

[22] Filed: Aug. 28, 1978

Related U.S. Application Data

[63] Continuation of Ser. No. 737,111, Oct. 29, 1976, abandoned.

[51] Int. Cl.² ............................................. F16K 31/02
[52] U.S. Cl. .................................... 251/138; 251/86; 251/298
[58] Field of Search ............... 251/30, 84, 86, 228, 251/298, 129, 138

[56] References Cited

U.S. PATENT DOCUMENTS

| | | | |
|---|---|---|---|
| 1,915,822 | 6/1933 | Green | 251/138 |
| 1,980,495 | 11/1934 | Muir | 251/86 |
| 2,274,776 | 3/1942 | Cull | 251/84 |
| 2,456,084 | 12/1948 | Ray | 251/138 |
| 2,645,940 | 7/1953 | Kohl et al. | 251/138 |
| 2,660,396 | 11/1953 | Heagerty | 251/84 |
| 2,694,414 | 11/1954 | Seyferth | 251/84 |
| 2,912,012 | 11/1959 | Klingler | 251/86 |
| 2,965,116 | 12/1960 | Boone et al. | 251/86 |
| 3,143,131 | 8/1964 | Spencer | 251/138 |
| 3,241,805 | 3/1966 | Schumann | 251/86 |
| 3,268,202 | 8/1966 | Murray et al. | 251/86 |
| 3,812,398 | 5/1974 | Kozel et al. | 251/129 |

Primary Examiner—Martin P. Schwadron
Assistant Examiner—G. L. Walton
Attorney, Agent, or Firm—R. J. McCloskey; E. Crist; R. Johnston

[57] ABSTRACT

A dishwasher drain valve provides axial alignment of inlet and outlet ports, a poppet is pivotally mounted in a chamber adjacent to the flow chamber of the valve and moves from a position blocking flow to one allowing substantially free straight through flow. The poppet is configured to provide self-centering within the valve body and allow for self-alignment with a valve seat formed in the through passage between the inlet and outlet ports.

4 Claims, 3 Drawing Figures

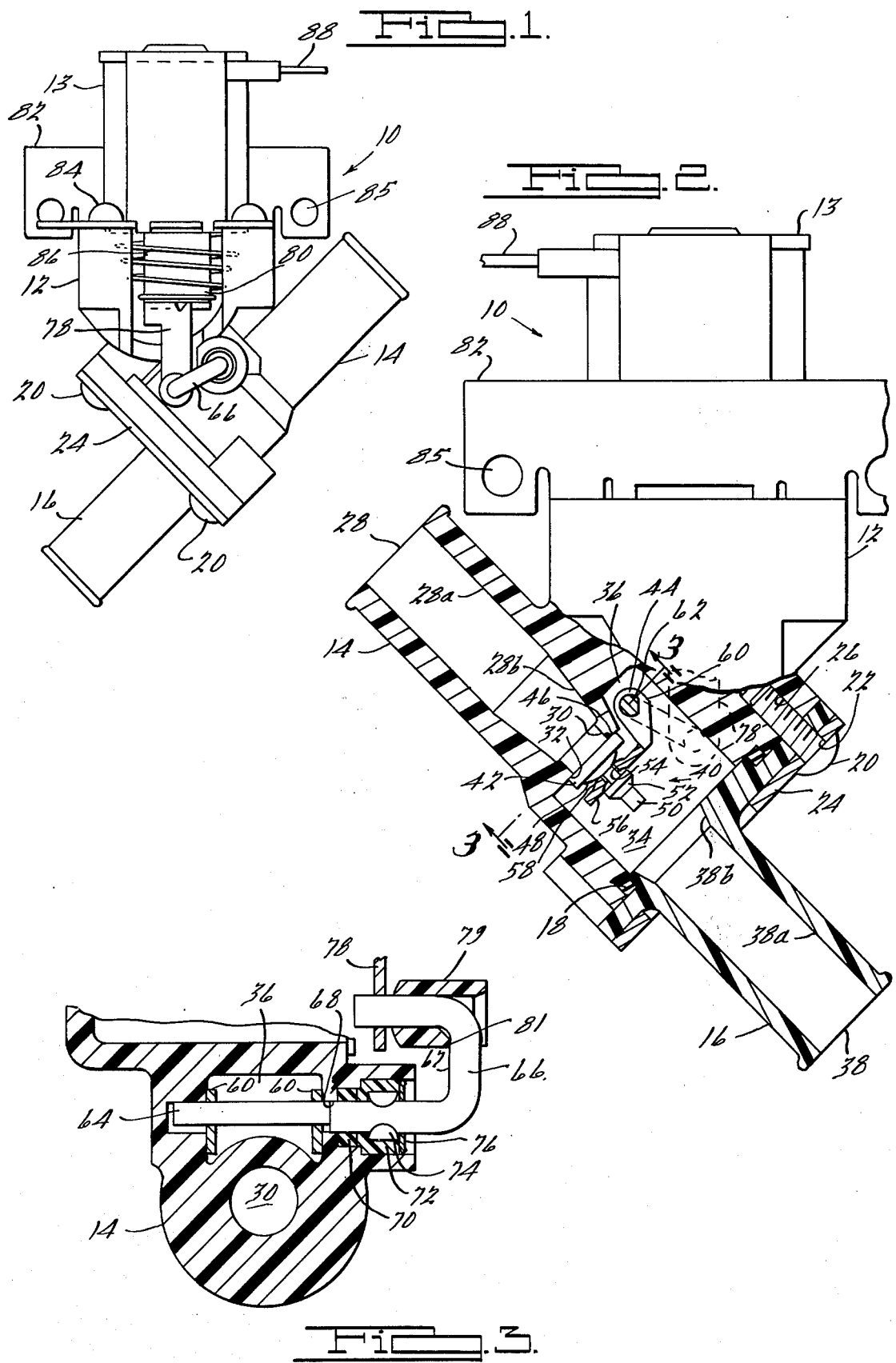

DRAIN VALVE

This is a continuation of application Ser. No. 737,111, filed Oct. 29, 1976, now abandoned.

BACKGROUND OF THE INVENTION

1. Field of the Invention

The invention relates generally to valves and more specifically to pivoted valves and valves adapted for use in automatic dishwashers.

2. Description of the Prior Art

A prime operational requirement of the drain valves used by the automatic dishwasher industry is that they be contaminant tolerant in that their use requires that they be able to pass elongated foreign objects entrained in the fluid from the dishwasher such as toothpicks, fish and animal bones, etc.

Prior art valves used to perform the named function have been deficient in meeting this operating requirement. Many had required flow through the valve to pass through one or more 90° bends. None have provided straight through flow path and many have been unduly complex and expensive. A recent example of such an unsuccessful response to the dishwasher operating requirement may be seen in U.S. Pat. No. 3,812,398 to Kozel et al issued May 21, 1974.

SUMMARY OF THE INVENTION

Responsive to the defects of prior art valves it is an object of the present invention to provide a drain valve for an automatic dishwasher which includes a straight through, substantially unrestricted flow path for the drain water.

It is another object of the present invention to provide such a valve that is relatively simple and economical to produce.

According to one feature of the invention, a valve is provided having a valve body defining a straight through flow passage and a pivotally mounted poppet operable to move into the flow passage to block flow and out of the flow passage to permit substantially unrestricted flow.

BRIEF DESCRIPTION OF THE DRAWINGS

These and other objects and features will become obvious to those skilled in the valve art upon reference to the accompanying specification and drawings in which FIG. 1 is a side elevation view of the drain valve of the present invention.

FIG. 2 is a partial cross-sectional view of the drain valve of the present invention, and FIG. 3 is a cross-sectional view of a portion of the valve taken along line 3—3 of FIG. 2.

DESCRIPTION OF THE PREFERRED EMBODIMENTS

The drain valve 10 of the present invention is illustrated as including a valve body 12 and a solenoid 13. The valve body 12 includes a molded inlet housing 14 and molded outlet housing 16. The interface between the inlet and outlet housings 14, 16 is sealed by an elastomeric static sealing member 18 and the outlet housing 16 is secured to the inlet housing 14 by a plurality of screws 20 passing through apertures 22 formed in a retainer plate 24 to threadedly engage apertures 26 formed in the inlet housing 14.

The inlet housing 14 defines an inlet passage 28 including a straight portion 28a and a coverging portion 28b terminating in a valve orifice 30 as may best be seen in FIG. 2. The orifice 30 terminates at flat seat 32 immediately inward therefrom as viewed in FIG. 2. A flow cavity 34 of substantially circular cross-section is formed in the inlet housing 14. The cavity 34 is intersected by a valve cavity 36 which may be seen in cross-section FIG. 3.

Outlet housing 16 includes an outlet flow passage 38 including a straight portion 38a and a converging portion 38b fluidly communicating with the flow chamber 34.

Referring now to FIGS. 2 and 3 a poppet valve member 40 is pivotally mounted in the valve chamber 36 for movement between this chamber and the flow chamber 34. The poppet member 40 includes an elastomeric sealing member 42 and a flapper plate or member 44. Sealing member 42 includes a flat sealing surface 46 and a spherical centering surface 48. It further includes a stem portion 50 having a projection 52 formed thereon to axially retain the sealing member 42 after insertion of the projection 52 through a bore 54 formed through a flat portion 56 of the flapper plate 44. The bore 54 is preferably formed through the flat portion 56 by punching or like process resulting in a formation of a preferably spherical surface 58 on the outer surface thereof adjacent the centering surface 48 of the sealing member 42 to enhance the self-alignment of the assembly.

The flapper plate 44 is formed in a generally rectangular shape including two upstanding flange portions 60 positioned on each of the longitudinal edges adjacent one end thereof as may best be seen in FIG. 2. A pair of generally semi-circular apertures 62 are formed through the flange portion 60 to drivingly engage a portion 64 of a crankshaft 66. The crankshaft 66 is generally U-shaped and has a circular cross-section except for that portion 64 passing through the flange portion 60 of the flapper plate 44. It is received in a bore 68 formed through the inlet housing 14 passing through a rotary elastomeric seal 70 and a bearing member 72. Axial retention of the crankshaft 66 is effected through deforming the shaft at 74 and engaging a conventional mechanical retainer 76 such as a star washer.

Crankshaft 66 is rotatively received an actuator plate or member 78 which is retained for axial movement with the armature 80 of the solenoid 13. Outward movement (rightward as viewed in FIG. 3) of the actuator plate 78 is limited by a molded spacer 79 which includes a flat surface 81 which can abut an inward facing surface 67 of the crankshaft 66 to establish a fixed minimum distance between the surface 67 and the actuator plate 78 if the spacer 79 and the plate 78 abut during operation. The freedom of movement of plate 78 to and from the abutting position serves to make operation relatively quiet. The solenoid 13 is secured to the housing 12 and supported by a mounting plate 82 through which are inserted a plurality of screws 84 (two shown). Apertures 85 are also formed through the plate 82 to permit mounting the valve 10 to a dishwasher body. The described mounting arrangement insures satisfactory alignment of the solenoid 13 and the inlet housing thereby further reducing noise in operating the solenoid. A conically formed biasing spring 86 is grounded between the actuator plate 78 and the mounting plate 82.

OPERATION OF THE PREFERRED EMBODIMENT

The valve 10 is illustrated in the drawing FIGS. 1-3 in the closed position. During operation of the dishwasher, fluid is supplied to the inlet passage 28 formed in inlet housing 14 at a static pressure of approximately 7 psig. The conical spring 86 exerts a force sufficient to maintain the poppet member 40 in the closed position against this pressure.

To open the valve an electrical potential is supplied across the leads indicated at 88 of the solenoid 13. This draws the armature 80 upward as viewed in FIG. 1. This in turn moves the actuator plate 78 upward against the force of the spring 86 and imparts a clockwise motion to the crankshaft 66 as viewed in FIG. 1. This motion is imparted to the flapper plate 44 through the drive apertures 62, resulting in counterclockwise movement of the poppet member 40 as viewed in FIG. 2. When the armature 80 attains its full upward position, the poppet member 40 is moved to a position substantially within the valve chamber 36, permitting substantially unrestricted flow through the valve. Fluid with entrained debris then moves through the straight passage 28a and the converging passage 28b increasing velocity as it passes through that passage and the orifice 30 to the flow cavity 34. It then passes through converging passage 38b into the straight passage 38a formed in the outlet housing 16 and passes out of the valve. This straight through flow with the venturi effect caused by the configuration of the passages tends to permit the straightening of elongated debris objects such as bones and toothpicks and reduces the tendency of the valve to clog especially in flow cavity 34 and valve cavity 36.

To close the valve the electrical potential at 88 is removed and the conical spring 86 returns the poppet member 40 to the closed position through operation of the actuator plate 78, the crankshaft 66 and the flapper plate 44 in the reverse of the operation previously described. In closing, the elastomeric sealing element 42 is permitted to self center with respect to the valve seat 32 by the cooperation of the opposed spherical surfaces 48 and 58 on the sealing element 42 and the flapper plate 44, respectively.

While the economical contaminant tolerant dishwasher drain valve of the present invention has been described in only one embodiment others are possible without departing from the scope of the attached claims. For example, the use of the invention valve in a dishwasher environment is described for illustrative purposes only, in addition the direction of flow described herein from inlet passage 28 to outlet passage 38 may be reversed without departing from the scope of the invention.

What is claimed is:

1. A drain valve for use in dishwashing machines, comprising:
   (a) a housing defining a substantially continuously extending flow chamber having an inlet passage and an outlet passage and a valve seat disposed in said flow chamber intermediate said inlet and outlet in the flow stream therebetween;
   (b) means defining a valve chamber communicating with said flow chamber in a direction transverse with respect to flow therethrough;
   (c) valve means including a pivot member disposed within said valve chamber and having portions thereof pivotally mounted therein, said valve means including a poppet mounted on said pivot member, said member being movable between a closed position in which said pivot member extends into said flow chamber and said poppet sealingly engages said valve seat to prevent the flow of fluid therethrough and an open position in which said pivot member and said poppet are substantially within said valve chamber whereby said flow chamber is substantially unrestricted;
   (d) means for biasing said pivot member and said poppet to said closed position;
   (e) solenoid means mounted on said housing and including a movable armature;
   (f) an actuator member having portions thereof connected to said armature;
   (g) said pivot member including a crank section extending exteriorly of said flow chamber, said actuator member having other portions thereof rotatably connected to said crank section near the free end thereof for translating movement of said actuator member to rotational movement of said pivot member; and
   (h) spacer means received on said crank section near the free end thereof, said spacer means being an annular member defining a transversely extending abutment surface which registers against portions of said crank section thereby limiting movement of said annular member on said crank section, said spacer means being effective for positioning said actuator member on said crank section such that a predetermined amount of lateral movement of said actuator member is permitted toward and away from said spacer means at said point of connection to said crank portion, said lateral movement of said actuator member being effective for permitting alignment of said armature within said solenoid for minimizing chatter and vibration therein, wherein said solenoid is operable upon activation to overcome the force of said biasing means to move said actuator member and said crank member thereby moving said poppet member to said open position.

2. A valve as defined in claim 1, wherein said annular member has a notch formed inwardly from one end and said abutment surface is defined by a flat surface located at the bottom of said notch with portions of said crank section extending radially outwardly through said notch.

3. A valve as defined in claim 1, wherein said inlet passage has an upstream portion thereof with a constant cross sectional area, said upstream portion of said inlet passage having a length substantially greater than the transverse internal dimension thereof, said inlet passage having a downstream portion thereof converging in cross sectional area.

4. The valve defined in claim 1 wherein said annular member includes a radially outwardly extending flange having said abutment surface formed thereon.

* * * * *